United States Patent
Magel (10) Patent No.: US 7,929,583 B2
(45) Date of Patent: Apr. 19, 2011

(54) SYSTEM AND METHOD FOR OPTICAL FREQUENCY CONVERSION

(75) Inventor: Gregory A. Magel, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 14 days.

(21) Appl. No.: 12/332,181

(22) Filed: Dec. 10, 2008

(65) Prior Publication Data

US 2010/0142569 A1 Jun. 10, 2010

(51) Int. Cl.
*H01S 3/10* (2006.01)

(52) U.S. Cl. ............... 372/21; 372/22; 372/69; 372/72

(58) Field of Classification Search ........... 372/21, 372/22, 69
See application file for complete search history.

(56) References Cited

U.S. PATENT DOCUMENTS

| 5,027,361 A | 6/1991 | Kozlovsky et al. | |
| 2009/0232169 A1* | 9/2009 | Koyata et al. | 372/22 |
| 2010/0054284 A1* | 3/2010 | Dekker et al. | 372/3 |

OTHER PUBLICATIONS

Ashkin, A., et al. "Resonant Optical Second Harmonic Generation and Mixing," IEEE Journal of Quantum Electronics, Jun. 1966, pp. 109-124, vol. QE-2, No. 6.
Regener, R., et al., "Efficient second-harmonic generation in Ti:LiNbO$_3$ channel waveguide resonators," J. Opt. Soc. Am. B, Feb. 1988, pp. 267-277, vol. 5, No. 2.
Fejer, Martin M., et al., "Quasi-Phase-Matched Second Harmonic Generation: Tuning and Tolerances," IEEE Journal of Quantum Electronics, Nov. 1992, pp. 2631-2654, vol. 28, No. 11.
Paschotta, R., et al., "82% Efficient continuous-wave frequency doubling of 1.06 μm with a monolithic MgO:LiNbO$_3$ resonator," Optics Letters, Sep. 1, 1994, pp. 1325-1327, vol. 19, No. 17.
Fujimura, Masatoshi, et al., "Resonant Waveguide Quasi-Phase-Matched SHG Devices with Electrooptic Phase-Modulator for Tuning," IEEE Journal of Selected Topics in Quantum Electronics, Jun. 1996, pp. 396-400, vol. 2, No. 2.
Tsunekane, Masaki, et al., "Elimination of chaos in a multilongitudinal-mode, diode-pumped, 6-W continuous-wave, intracavity-doubled Nd:YAG laser," Optics Letters, Jul. 1, 1997, pp. 1000-1002, vol. 22, No. 13.
Treviño-Palacios, Carlos Gerado, "Novel Effects in Waveguide Second Harmonic Generation," Ph.D. Dissertation, 1998, Orlando, Florida.

(Continued)

*Primary Examiner* — Dung T Nguyen
(74) *Attorney, Agent, or Firm* — Charles A. Brill; Wade James Brady, III; Frederick J. Telecky, Jr.

(57) ABSTRACT

A system and method for optical frequency conversion having asymmetric output include a coherent light apparatus. The coherent light apparatus includes a coherent light source that produces a first coherent light, a frequency converter optically coupled to the coherent light source, and a coupling optic optically coupled between the coherent light source and the frequency converter. The frequency converter converts the first coherent light to a second coherent light at a second frequency and includes an asymmetric frequency converter (AFC) that nonlinearly converts the first coherent light to the second coherent light with the frequency conversion being more efficient in a first direction than in a second direction. A resonant cavity formed about the AFC circulates the first coherent light and transmits the second coherent light propagating in the first direction.

18 Claims, 6 Drawing Sheets

OTHER PUBLICATIONS

Gallo, Katia, et al., "All-optical diode based on second-harmonic generation in an asymmetric waveguide," J. Opt. Soc. Am. B, Feb. 1999, pp. 267-269, vol. 16, No. 2.

Gallo, Katia, et al., "All-optical diode in a periodically poled lithium niobate waveguide," Applied Physics Letters 79, Jul. 16, 2001, pp. 314-316, vol. 79, No. 3.

Konotop, Vladimir V., et al., "Nonreciprocal frequency doubler of electromagnetic waves based on a photonic crystal," Physical Review B 66, Dec. 31, 2002, pp. 235208-1 to 235208-5, vol. 66.

Xue, Q. H., et al., "High-power efficient diode-pumped $Nd:YVO_4/LiB_3O_5$ 457 nm blue laser with 4.6 W of output power," Optics Letters, Apr. 15, 2006, pp. 1070-1072, vol. 31, No. 8.

Gao, Z. D., et al., "Monolithic red-green-blue laser light source based in cascaded wavelength conversion in periodically poled stoichiometric lithium tantalate," Applied Physics Letters 89, 2006, 3 pages, vol. 89.

\* cited by examiner

SYSTEM AND METHOD FOR OPTICAL FREQUENCY CONVERSION

TECHNICAL FIELD

The present invention relates generally to a system and method for optical frequency conversion, and more particularly to a system and method for optical frequency conversion having asymmetric output.

BACKGROUND

Nonlinear optical frequency conversion is commonly used to generate coherent optical radiation at wavelengths for which direct laser sources are inefficient or unavailable. For example, laser optical radiation (light) is often converted from the infrared spectrum, where efficient laser sources are available, into the visible spectrum, such as blue and green, since in general, efficient laser sources for the blue and/or green spectra are not available. Because nonlinear coefficients of transparent materials are small, several methods are used to enhance the efficiency of the interactions.

In general, second-order nonlinear effects are used most frequently in frequency conversion. Because second-order nonlinear effects use the lowest-order material nonlinearity, they exhibit the strongest nonlinear coupling coefficients. Examples of second-order nonlinear processes include second harmonic generation (SHG), sum frequency generation (SFG), difference frequency generation (DFG), and optical parametric generation (OPG), which includes optical parametric amplifiers (OPA) and optical parametric oscillators (OPO). In second-order nonlinear processes, the nonlinear coefficients of the nonlinear material couple three interacting optical fields (or waves), with differences between the above listed processes being the wavelengths of the interacting waves (which waves are the input waves, and which waves are the output waves).

In SHG, for example, the three interacting optical fields involve two photons at a fundamental input wavelength and one photon at an output wavelength (a second harmonic of the input wavelength, which is at twice the frequency of the fundamental frequency). SFG combines two strong lower-frequency fields to generate an output wave at a higher sum frequency, DFG generates a longer-wavelength difference wave from two strong input fields, while OPG generates two output wavelengths (a signal field and an idler field) from a single high-power input field (pump).

Generally, more efficient conversion is possible at higher optical intensities (i.e., higher power per unit area) and with longer interaction lengths within a nonlinear medium. Limits to frequency conversion may be set by available input power levels, material optical damage limits, reliability, nonuniformity or imperfection in the nonlinear materials (which may limit the effective interaction length), and so forth.

Commonly used techniques, such as placing a nonlinear material in its own optical resonator external to a source laser, may be used to enhance the power level of input radiation and effective interaction length. Alternatively, the nonlinear medium may be placed inside the cavity of a laser (e.g., an intracavity frequency converter) where there is high circulating fundamental intensity, and the converted light is taken as the output. Optical resonators and laser cavities may be of a standing-wave (bi-directional propagation) or ring (unidirectional propagation) type. Optical waveguides may also be used to increase interaction length over which light is kept at a high intensity. Standing-wave resonators are typically simpler to fabricate than ring resonators, but they generally have a bi-directional output requiring additional optics to combine the outputs. This results in unwanted complexity, as well as interference effects in the combined output beam, which may have detrimental effects on the combined output beam's optical quality and temporal stability.

SUMMARY OF THE INVENTION

These and other problems are generally solved or circumvented, and technical advantages are generally achieved, by embodiments of a system and a method for optical frequency conversion having asymmetric output.

In accordance with an embodiment, a coherent light apparatus is provided. The coherent light apparatus includes a coherent light source, a frequency converter optically coupled to the coherent light source, and a coupling optic optically coupled between the coherent light source and the frequency converter. The coherent light source produces a first coherent light at a first frequency, and the coupling optic matches a first mode of the first coherent light to a second mode of the resonant cavity. The frequency converter converts the first coherent light to a second coherent light at a second frequency. The frequency converter includes an asymmetric frequency converter (AFC), and a resonant cavity formed about the AFC. The AFC nonlinearly converts the first coherent light to the second coherent light, with the frequency conversion being more efficient in a first direction than in a second direction. The resonant cavity circulates the first coherent light and transmits the second coherent light propagating along the first direction out of the resonant cavity.

In accordance with another embodiment, a method for producing coherent light is provided. The method includes providing a first coherent light at a first frequency, and coupling the first coherent light at the first frequency into an optical frequency converter. The method also includes converting the coupled first coherent light into a second coherent light at a second frequency, and emitting the second coherent light at the second frequency. The converting of the coupled first coherent light is more efficient in a first direction than in a second direction.

In accordance with another embodiment, a display system is provided. The display system includes a coherent light apparatus, an image input, a display, and a controller coupled to the display and to the image input. The coherent light apparatus produces a first coherent light at a first frequency by frequency conversion of a second coherent light at a second frequency. The frequency conversion is more efficient in a first direction than in a second direction and the frequency conversion occurs in a resonant cavity. The image input provides image data, while the display produces images based on the image data by modulating the first coherent light produced by the coherent light apparatus. The controller controls the operation of the display based on the image data.

An advantage of an embodiment is that unidirectional output is provided, which may emit radiation in a more desirable forward direction.

A further advantage of an embodiment is that a geometry for a monolithic resonator is presented that simplifies fabrication and alignment. This may help to improve performance while keeping manufacturing costs low.

Another advantage of an embodiment is that asymmetry of a frequency converter is maximized. This may help to improve stability of the frequency converted output by minimizing interference effects.

An additional advantage of an embodiment is that high power operation is provided, enabling applications that require high intensity radiation.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a coherent light source that produces coherent light at a desired frequency by using SHG second-order nonlinear frequency conversion of a light at a frequency that is one-half the desired frequency. The invention may also be applied, however, to other coherent light sources that use other second-order nonlinear frequency conversion techniques, including SFG, DFG, OPG, and so forth. Additionally, the invention may be applied to coherent light sources using nonlinear frequency conversion of different orders, such as third-order, fourth-order, and so forth.

Figure 1:
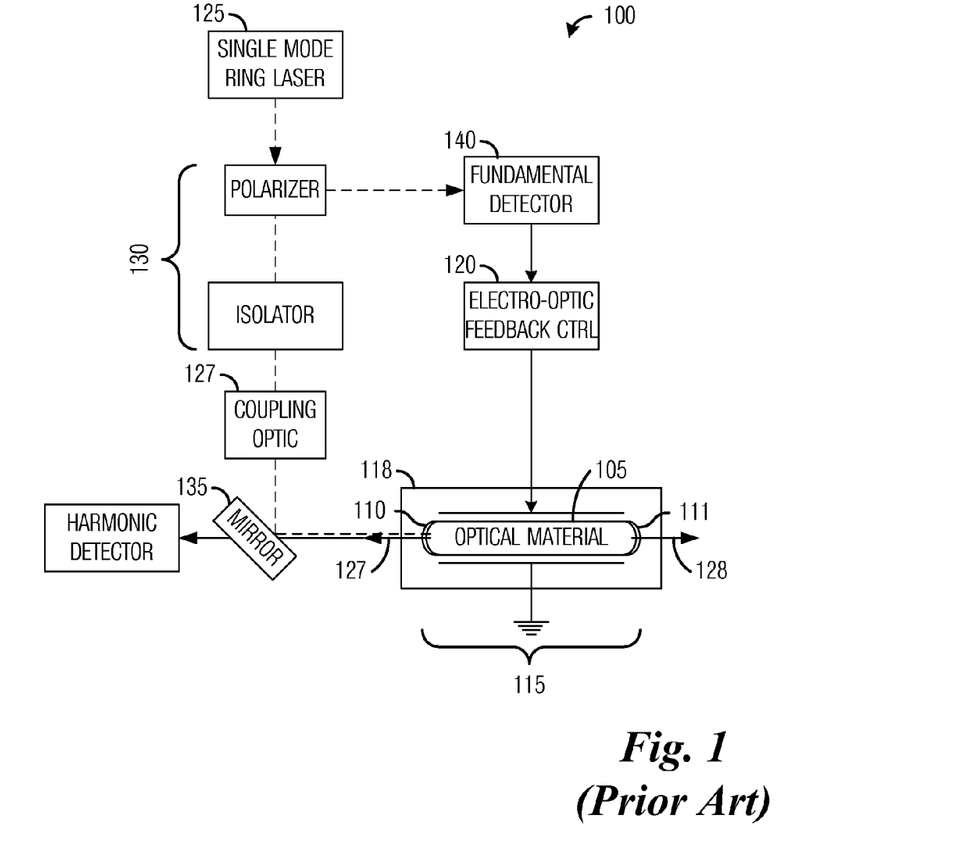
FIG. 1 is a diagram of a prior art laser harmonic generator.

FIG. 1 shows a diagram that illustrates a prior art laser harmonic generator 100. Laser harmonic generator 100 includes a nonlinear optical material 105 disposed within a standing wave type optical resonator, wherein two coaxial spherical facets (facet 110 and facet 111) are polished onto opposite ends of nonlinear optical material 105 and reflective material formed on the spherical facets. Collectively, nonlinear optical material 105 and spherical facets form an optical resonator 115. Nonlinear material 105 may be contained within an oven 118 to maintain a phasematching temperature, while an electro-optic feedback control system 120 may be used to tune the resonant mode of optical resonator 115 to the wavelength of radiation derived from single mode ring laser 125. Coupling optics 127 may be provided to mode match the incident beam from laser 125 into optical resonator 115.

Optical resonator 115 generates light at a harmonic of a fundamental frequency (the frequency of the radiation emitted by single mode ring laser 125) through the spherical facets, with a portion of the generated harmonic power emitting through facet 110 (shown as beam 127) and a portion of the generated harmonic power emitting through facet 111 (shown as beam 128). For discussion purposes, let a beam emitted from optical resonator 115 (beam 127, for example) and directed back towards single mode ring laser 125 be defined as a backward beam and a beam emitted from optical resonator 115 (beam 128, for example) and directed away from single mode ring laser 125 be defined as a forward beam.

An isolator/polarizer 130 may be used to reject light reflected (by way of mirror 135) from optical resonator 115 to prevent it from returning to laser 125. The light rejected by isolator 130 may be used as a feedback signal to lock the optical resonator 115 to the wavelength of the radiation of single mode ring laser 125. A fundamental detector 140 may detect a portion of light at the fundamental frequency as emitted by single mode ring laser 125 and an output of fundamental detector 140 may be provided to electro-optic feedback control system 120 for use in tuning the resonant mode of optical resonator 115.

Since optical resonator 115 emits about ½ of the generated harmonic power through facet 110 and about ½ of the generated harmonic power through facet 111, optical frequency conversion performed by laser harmonic generator 100 is generally inefficient unless the emissions of optical resonator 115 is combined.

Figure 2A:
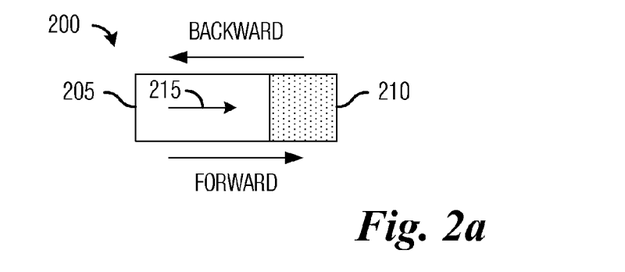
FIGS. 2a and 2b are diagrams of an asymmetric frequency converter.
Figure 2B:
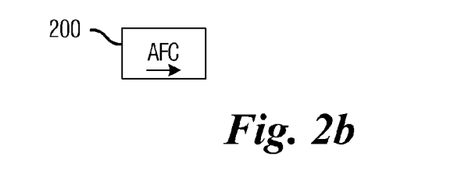

FIG. 2a is a diagram of an asymmetric frequency converter (AFC) 200. An asymmetric frequency converter may be defined as an optically nonlinear element that exhibits efficient frequency conversion for input traveling through AFC 200 in a first direction (defined herein as a forward direction) and relatively inefficient (or none) frequency conversion for input traveling through AFC 200 in a second and opposite direction (defined herein as a backward direction). AFC 200 frequency converts radiation at a fundamental frequency into radiation at a harmonic (or one or more harmonics) of the fundamental frequency. FIG. 2b is a diagram illustrating a block diagram of AFC 200. AFC 200 in block form may be represented as a box with an arrow indicating the forward direction.

AFC 200 may be a structure whose nonlinear properties are not spatially symmetric about a center of the structure along the direction of propagation, either in wavevector mismatch (phasematching) or in nonlinear coupling strength, or in some other property that allows transmission of the fundamental frequency in both directions but inhibits generation or propagation of a harmonic of the fundamental frequency in the backward direction.

AFC 200 does not need to be completely asymmetric (i.e., with absolutely no frequency conversion to a harmonic of the fundamental frequency in the backward direction) since interference between forward and backward generated output will be reduced by any amount of asymmetry introduced and may be beneficial in establishing a preferential output direction with enhanced stability.

The asymmetry of AFC 200 may be indicated schematically by two differently-shaded regions (region one 205 and region two 210) of different lengths as well as an arrow 215 indicating the forward direction. As shown in FIG. 2a, the schematic of AFC 200 is intended to make the forward direction easy to recognize but not to limit the disclosed embodiments. A variety of structures with one or more different propagation properties that may be used to create an AFC, including seeded SHG, and photonic crystal structures having asymmetric and/or frequency-dependent propagation properties. When designing a specific type of structure, such as constructing synthetic quasi-phasematched structures with tailored periods and introduced aperiodic defects to control harmonic phase, there may be many non-unique designs capable of producing the same asymmetric SHG properties. The different structure types may be optimized for desired degree of efficiency and asymmetry, as well as for operating at a particular set of power levels for the fundamental frequency and the harmonic.

An example of an AFC, albeit one that is nonreciprocal in transmission of the fundamental frequency, is the combination of stratified media comprising a quasi-phasematched nonlinear substructure (corresponding to region 210 in FIG. 2a) and a photonic crystal substructure (corresponding to region 215 in FIG. 2a) (see V. V. Konotop and V. Kuzmiak, Phys. Rev. B. 66, 235208 (2002)). In contrast, an AFC optimized for use within the embodiments would be reciprocal and low-loss at the fundamental frequency (i.e., the fundamental frequency belongs to an allowed zone in both regions), but nonreciprocal for the harmonic, preventing the harmonic from being generated in the backward direction (e.g., by the harmonic frequency falling into a photonic bandgap within region 215 to prevent its transmission in the backward direction).

Another type of AFC may use seeded harmonic generation. In this type of process, the phase of a relatively small-amplitude incident harmonic signal has a large influence on the generation of the harmonic from the fundamental frequency. Structures within the AFC that influence the relative phase of the fundamental frequency and the harmonic may be introduced and are placed asymmetrically in space within the AFC and that therefore operate differently for signals incident from the opposite directions. See K. Gallo and G. Assanto, J. Opt. Soc. Am. B, 267 (1999) for an example of such an AFC. Such a structure must be designed to operate at a particular power level, consistent with the circulating fundamental frequency power within an optical standing-wave resonator.

Figure 3A:
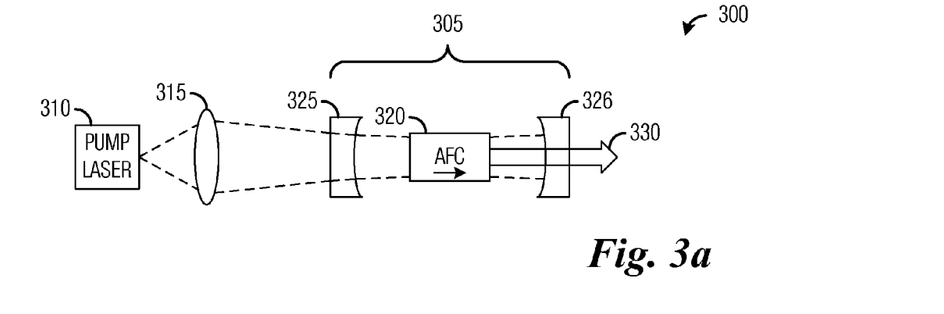
FIG. 3a is a diagram of a coherent light source with an optical frequency conversion device made from discrete components.

FIG. 3a is a diagram illustrating a coherent light source 300. Coherent light source 300 includes an optical frequency conversion device (OFCD) 305, a pump laser 310, and coupling optics 315. OFCD 305 may perform optical frequency conversion on radiation emitted at a fundamental frequency by pump laser 310 and coupling optics 315 may be used to efficiently mode match the transverse mode of the radiation emitted by pump laser 310 to the transverse mode of OFCD 305 to allow for maximum mode overlap and hence highest coupling efficiency. Coupling optics 315 may be implemented using optical lenses, focusing elements, fiber optics, waveguides, as well as optical devices that may be capable of preventing detrimental back reflections of the radiation emitted by pump laser 310, such as Faraday isolators, and so forth.

OFCD 305 includes an AFC 320 placed inside a resonant cavity formed from discrete mirror elements (mirror 325 and mirror 326). AFC 320 may be oriented so that the forward direction is away from pump laser 310, therefore, OFCD 305 may emit radiation mostly in a direction indicated by arrow 330. Orienting AFC 320 so that the forward direction is away from pump laser 310 may allow for a collinear arrangement of pump laser 310 and coherent light source 300 output (arrow 330) that enables relatively simple construction.

To increase efficiency, the reflectivity of mirror 325 at the fundamental frequency (the frequency of radiation emitted by pump laser 310) should be selected such that the transmission of the radiation emitted by pump laser 310 into the resonant cavity is approximately equal to a sum of linear and nonlinear losses of the resonant cavity at the fundamental frequency. This may be referred to as impedance matching and, when met, there will be no reflection of radiation emitted by pump laser 310 back towards pump laser 310 and all radiation emitted by pump laser 310 will be converted into a harmonic with maximum efficiency. Since the nonlinear loss due to frequency conversion to a harmonic of the fundamental frequency is a function of the circulating power within the resonant cavity, a self-consistent calculation may be made to solve for reflectivity of mirror 325 at a given input and circulating optical power level. Thus AFC 320, whose operation may be dependent on optical power level, should also be optimized for the same circulating optical power level. Also, the resonant cavity should be designed so that once the radiation emitted by pump laser 310 enters the resonant cavity, it should circulate within the resonant cavity.

Furthermore, depending on the orientation of AFC 320, the reflectivity of mirrors 325 and 326 to the radiation emitted by AFC 320 may be different. For example, as shown in FIG. 3a, AFC 320 is oriented so that it emits more efficiently towards mirror 326. Therefore, mirror 326 may be designed so that it will transmit (or substantially transmit) the radiation emitted by AFC 320, while mirror 325 may be designed so that it will reflect (or substantially reflect) the radiation emitted by AFC 320. Similarly, if AFC is oriented so that it emits more efficiently towards mirror 325, then mirror 325 may be designed so that it will transmit (or substantially transmit) the radiation emitted by AFC 320, while mirror 326 may be designed so that it will reflect (or substantially reflect) the radiation emitted by AFC 320.

The conversion efficiency and impedance matching conditions for OFCD 305 comprising a standing wave resonator and an AFC 320 may be calculated using minor modifications of the theory given in Kozlovsky (U.S. Pat. No. 5,027,361) which is incorporated herein by reference. The modifications required take into account that in an AFC, nonlinear conversion occurs in one direction through the AFC only, whereas linear losses at the fundamental frequency expressed by the transmission factor t occur for both directions of propagation through the AFC. Therefore, for a standing wave cavity containing an AFC, the equation for the cavity reflectance parameter $r_m$ and the second harmonic power $P_{SH}$ resemble the equations for a ring cavity as given by Kozlovsky. These parameters may then be used to calculate the reflectivity of mirror 325 that provides for impedance matching and therefore optimizes input coupling and conversion efficiency, and hence the enhancement of the fundamental frequency power on resonance and the overall conversion efficiency of the OFCD.

Figure 3B:
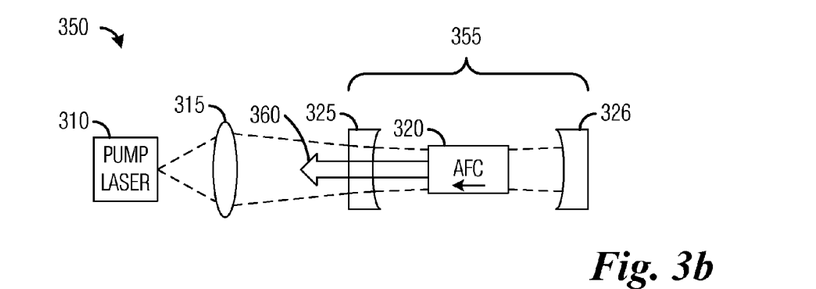
FIG. 3b is a diagram of a coherent light source with an optical frequency conversion device made from discrete components.

FIG. 3b is a diagram illustrating a coherent light source 350. Like coherent light source 300, coherent light source 350 includes an OFCD 355 with AFC 320 placed inside a resonant cavity formed from discrete mirror elements (mirror 325 and mirror 326). However, the orientation of AFC 320 is reversed in OFCD 355 so that the forward direction is pointed towards pump laser 310 rather than away from pump laser 310. Such a configuration may be desirable if there is a favorable combination of optical elements on that side of the resonant cavity.

Not shown in FIGS. 3a and 3b, but may be required for stable operation, are an oven or temperature control system for maintaining optimum phasematching condition for nonlinear frequency conversion, and an electro-optic feedback control system to tune the resonant cavity to the fundamental frequency of pump laser 310 and to maintain a lock on the tuning to ensure maximum circulating power enhancement. Electro-optic feedback control systems using techniques such as dithering, Hänsch-Couillaud, Pound-Drever-Hall, and so forth, may be suitable. Furthermore, the components of OFCD 305 and OFCD 355 may not be drawn to scale, therefore, the relative sizes of mirror 325, mirror 325, and AFC 320, as shown in FIGS. 3a and 3b should not be construed as indicating a preferred embodiment.

Figure 4A:
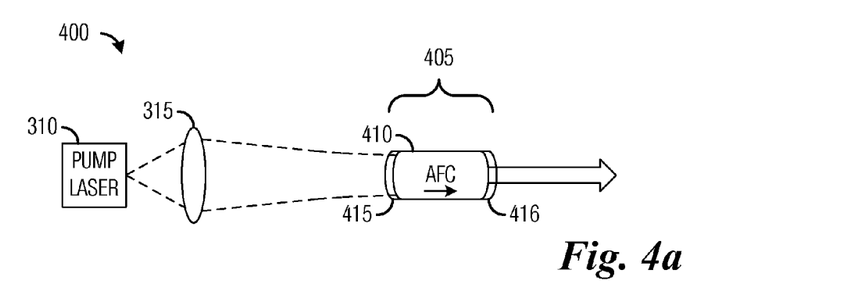
FIG. 4a is a diagram of a coherent light source with a monolithic optical frequency conversion device.

FIG. 4a is a diagram illustrating a coherent light source 400, wherein coherent light source 400 includes a monolithic OFCD 405. Monolithic OFCD 405 may be fabricated by polishing ends of an AFC 410 and directly coating mirrors (mirror 415 and mirror 416) on the polished ends of AFC 410. As shown in FIG. 4a, AFC 410 is oriented so that the forward direction is pointed away from pump laser 310, however, it may be possible to orient AFC 410 so that the forward direction is pointed toward pump laser 310.

Figure 4B:
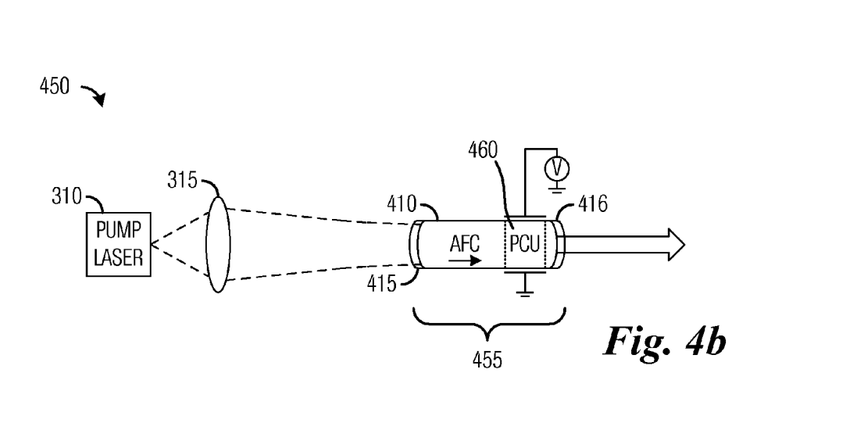
FIG. 4b is a diagram of a coherent light source with a monolithic optical frequency conversion device and a phase control unit.

FIG. 4b is a diagram illustrating a coherent light source 450, wherein coherent light source 450 includes a monolithic OFCD 455. Monolithic OFCD 455 includes AFC 410 and mirrors (mirror 415 and mirror 416) directly coated on polished ends of AFC 410. Monolithic OFCD 455 also includes an electro-optic phase control unit (PCU) 460 located within the resonant cavity formed by mirrors 415 and 416. A purpose of PCU 460 may be to ensure the proper phase of the harmonic radiation in a seeded harmonic generation device is maintained as it enters the AFC. PCU 460 may be used for adjusting a relative phase between radiation at the fundamental frequency and radiation at a harmonic of the fundamental frequency. PCU 460 may be used to adjust the direction of the radiation at the harmonic of the fundamental frequency under electronic control or provide rapid modulation of the radiation. This form of modulation may be more sensitive (require less voltage) and, therefore, may be a potentially higher-speed output modulation method than altering the phasematching condition through an electro-optic tuning of a refractive index to control frequency conversion.

Although shown in FIG. 4b as being located at an emission end of OFCD 455 (before mirror 416), PCU 460 may also be located in other positions of OFCD 455. For example, PCU 460 may be positioned between mirror 415 and AFC 410, between AFC 410 and mirror 416, between AFC and other intracavity elements such as other nonlinear elements, and so forth. Additionally, the components of OFCD 405 and 455 may not be drawn to scale, therefore, the relative sizes of mirror 415, mirror 416, AFC 410, and PCU 460, as shown in FIGS. 4a and 4b should not be construed as indicating a preferred embodiment.

As with FIGS. 3a and 3b, components used for stable operation have been omitted in FIG. 4a, including an oven or temperature control system for maintaining optimum phasematching condition for nonlinear frequency conversion, and an electro-optic feedback control system to tune the resonant cavity to the fundamental frequency of pump laser 310 and to maintain a lock on the tuning to ensure maximum circulating power enhancement. FIG. 4b also omits an oven or temperature control system.

Figure 5A:
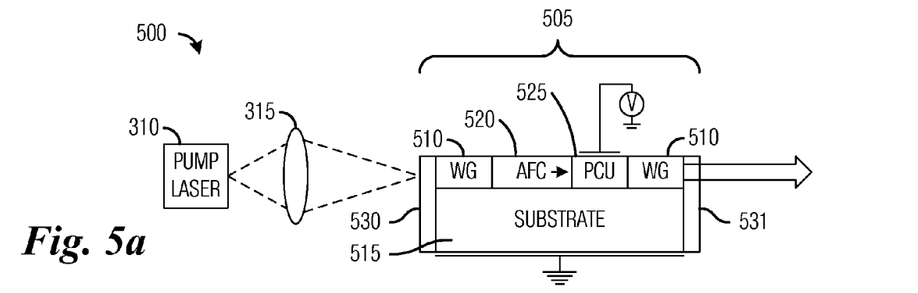
FIG. 5a is a diagram of coherent light source with an optical frequency conversion device formed in a waveguide channel.

FIG. 5a is a diagram illustrating a coherent light source 500, wherein coherent light source 500 includes an OFCD 505 formed from an optical waveguide. OFCD 505 includes a waveguide (WG) 510 formed on a substrate 515. An AFC 520 may be formed within a channel of WG 510. OFCD 505 also includes a PCU 525, also formed within the channel of WG 510. When using optical waveguides, an AFC may be formed within the channel of a waveguide (as shown in FIG. 5a) or a channel of a waveguide may be formed in a bulk substrate or bulk crystal in which an AFC may already be formed. Mirrors 530 and 531 forming a resonant cavity may be created by polishing and coating ends of WG 510 with a reflective material, such as a dielectric or a metallic material.

Generally, especially with respect to PCU operation, electro-optic waveguide devices may be more efficient than bulk electro-optic devices since they require low voltages to operate due to electrodes being placed closer together on either side lateral to the waveguide, or through a thin substrate (when a contact is placed at the bottom of the substrate), as shown in FIG. 5a. This may allow for high-speed modulation of radiation emitted by coherent light source 500, on the order of GHz.

Figure 5B:
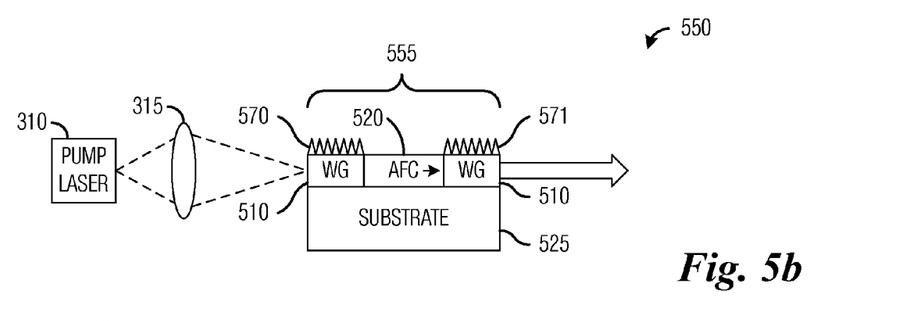
FIG. 5b is a diagram of coherent light source with an optical frequency conversion device formed in a waveguide channel using distributed reflectors.

FIG. 5b is a diagram illustrating a coherent light source 550, wherein coherent light source includes an OFCD 555 formed from an optical waveguide. OFCD 555 may be similar to OFCD 505, with AFC 520 formed in a channel of WG 510. However, rather than polishing and coating the ends of WG 510 with a reflective material to form mirrors, reflectors of distributed Bragg reflector (DBR) type 570 and 571 may be used. This is indicated schematically by the periodic ridges shown on the top surface of WG 510. Such DBR mirrors 570 and 571 may be formed by etching periodic ridges onto the surface of the waveguide as shown, or alternatively by creating a permanent periodic refractive index grating within the waveguide channel 510 or even within the AFC material 520. If a periodic reflecting structure extends throughout the length of the OFCD 555 instead of as two separate reflectors, such a reflector may be referred to as a distributed feedback (DFB) structure.

FIG. 5b omits a PCU to simplify the diagram. Although shown with AFC 520 oriented so that radiation is emitted away from pump laser 310, AFC 520 of FIGS. 5a and 5b may be oriented so that radiation is emitted towards pump laser 310.

Figure 6A:
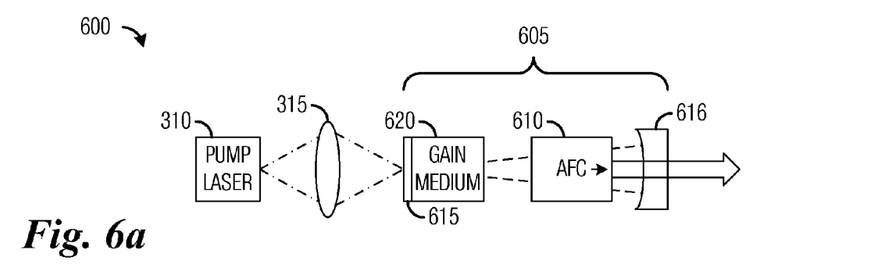
FIGS. 6a through 6d are diagrams of coherent light sources formed from intracavity frequency converted lasers.

FIG. 6a is a diagram illustrating a coherent light source 600, wherein coherent light source 600 is an intracavity frequency converted laser and is arranged in a collinear fashion. Coherent light source 600 includes an intracavity frequency converted laser (IFCL) 605 that is a linear standing-wave cavity of a semi-monolithic design. IFCL 605 forms a resonant cavity of a laser. IFCL 605 includes an AFC 610 positioned in a linear cavity with a mirror 615 formed directly on a surface of a gain medium 620. Although shown with mirror 615 formed directly on the surface of gain medium 620, mirror 615 may also be a discrete component rather than formed directly on the surface of gain medium 620.

Mirror 616 completes the linear cavity. In such a configuration, mirror 615 may be designed for maximum reflection of radiation at the fundamental frequency and maximum transmission of radiation from pump laser 310. Mirror 616 may also be designed to be highly reflective of radiation at the fundamental frequency and maximally transmissive of radiation at a harmonic of the fundamental frequency. Output of coherent light source 600 occurs at a harmonic of the fundamental frequency instead of partial transmission of the fundamental frequency. This may allow for high circulating intensity of radiation at the fundamental frequency and therefore, high frequency conversion frequency.

Gain medium 620 may be a laser gain medium, i.e., a medium that provides optical gain at the fundamental frequency by a population inversion of real excited states of an atomic, molecular, doped, or stoichiometric crystalline material. Additionally, gain medium 620 may provide optical gain through nonlinear optical or other means, such as through parametric amplification in a nonlinear material. Therefore, alternative embodiments of coherent light sources shown in FIGS. 6a through 6c may be achieved by inserting an AFC into an OPO or inserting an OPA into a resonant asymmetric frequency converter.

Figure 6B:
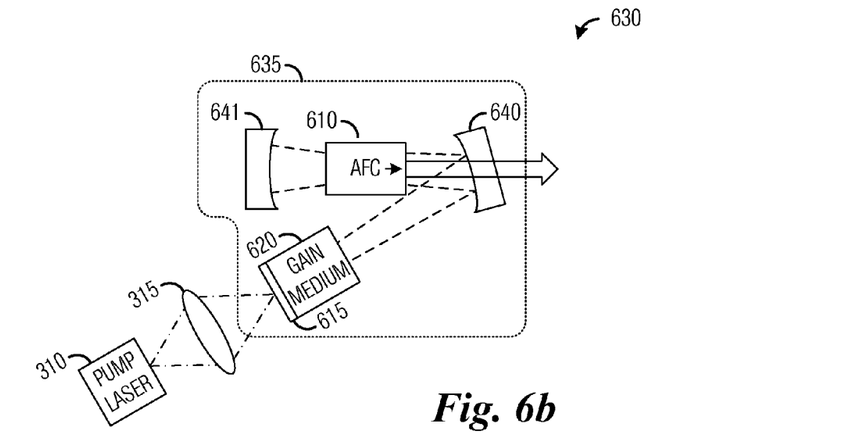
Figure 6C:
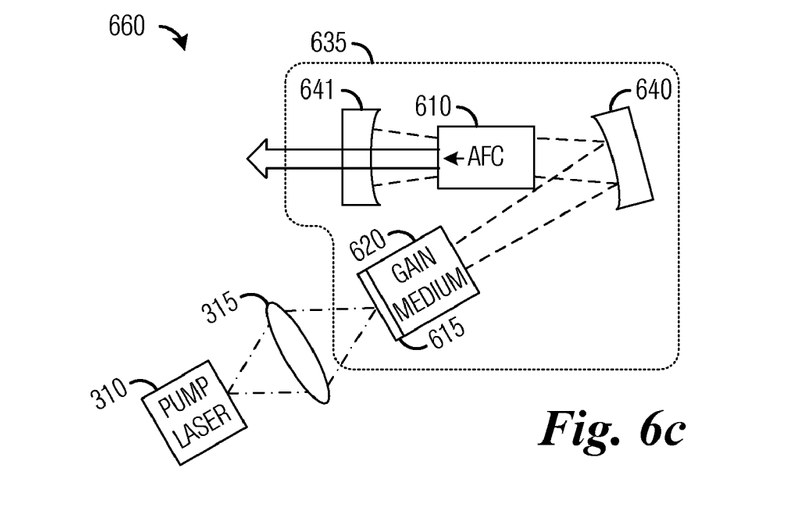
Figure 6D:
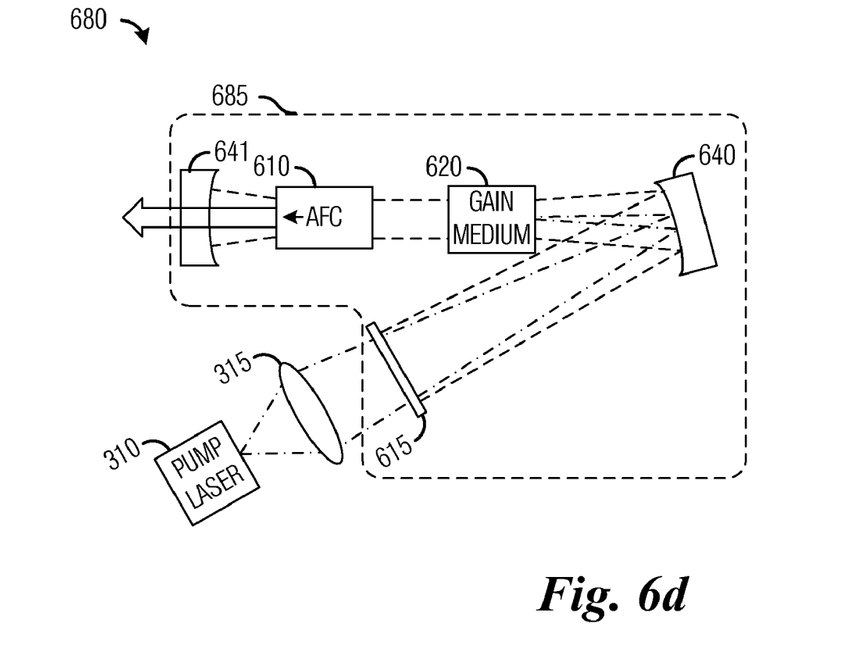

FIG. 6b is a diagram illustrating a coherent light source 630, wherein coherent light source 630 is an intracavity frequency converted laser with a fold mirror and is arranged in a non-collinear fashion. Coherent light source 630 includes an IFCL 635 that is a folded, V-shaped cavity of a semi-monolithic design. IFCL 635 includes AFC 610 disposed between mirrors 640 and 641. Mirror 640 also functions as a fold mirror. The use of mirror 640 as a fold mirror may allow for a tight focus of laser cavity mode within the nonlinear material in AFC 610, which may yield higher frequency conversion efficiency, while simultaneously allowing for a second focus within the laser gain medium proximate pump mirror 615. Furthermore, the use of the fold mirror may enable a more compact design for coherent light source 630. FIG. 6c illustrates a coherent light source 660 arranged in a non-collinear fashion with AFC 610 oriented so that coherent light source 660 emits radiation through mirror 641. FIG. 6d illustrates a coherent light source 680 with an IFCL 685 arranged so that gain medium 620 and AFC 610 are collinear, i.e., both gain medium 620 and AFC 610 are located in one portion of the folded, V-shaped cavity.

Embodiments shown herein have included a single AFC in a resonant cavity. However, it is possible to include multiple frequency conversion devices in a resonant cavity, with one or more of the frequency conversion devices being an AFC. For example, multiple frequency conversion devices may be arranged sequentially in the resonant cavity, with an AFC located at the end and/or the start of, or at any position within, the sequence. Alternatively, multiple AFCs may be arranged sequentially in the resonant cavity.

Figure 7:
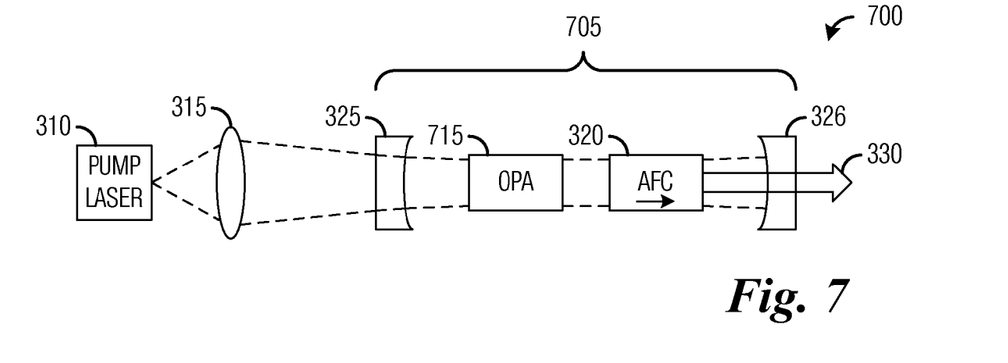
FIG. 7 is a diagram of a coherent light source with an optical frequency conversion device based on two cascaded nonlinear processes.

FIG. 7 is a diagram illustrating a coherent light source 700. Coherent light source 700 includes an OFCD 705, pump laser 310, and coupling optics 315. OFCD 705 includes more than one nonlinear devices within a resonant cavity formed by mirrors 325 and 326 to generate light at multiple and/or different output frequencies. For example, the light produced by coherent light source 700 may include multiple harmonics of the fundamental frequency. As shown in FIG. 7, the nonlinear devices include AFC 320 and an OPA 715. Although shown with OPA 715 positioned in front of AFC 320, OPA 715 may be positioned after AFC 320. The multiple nonlinear devices within a resonant cavity may be formed from discrete components, monolithic components, or a combination thereof.

It may be possible to incorporate nonlinear parametric gain into an OFCD using an OPA (as opposed to a laser gain medium) within a resonant cavity containing an AFC. The OPA and AFC may be separate pieces of material or in a single piece. For example, it may also be possible to incorporate a structure of an OPA into a monolithic AFC. This may be achieved by using quasi-phasematching (QPM) of one periodicity for an OPA section (converting the wavelength of radiation emitted by a pump laser into signal and idler wavelengths) and a different period/structure for an AFC section (performing a different frequency conversion process, for example, SHG, SFG, and so forth) which generally requires different phasematching conditions than that of the OPA. The OPA may exhibit optical gain at the fundamental frequency, while the AFC may be designed to preferentially generate a harmonic of the fundamental frequency in the forward direction.

Figure 8:
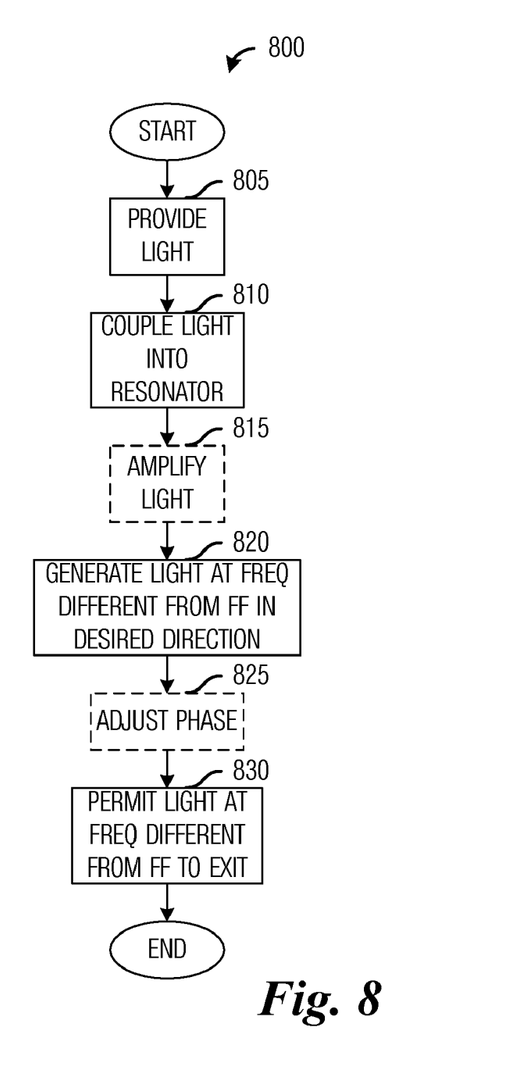
FIG. 8 is a flow diagram for optical frequency conversion.

FIG. 8 is a flow diagram 800 illustrating optical frequency conversion. Flow diagram 800 illustrates optical frequency conversion making use of at least one frequency conversion device having an asymmetric frequency conversion property. The order of the events in this sequence may be changed, some optional steps may be omitted or included, or some of the steps may be performed at the same time to meet particular manufacturing requirements of the various embodiments, for example.

Optical frequency conversion begins with a light source, such as a coherent light source, providing light (block 805). The light provided by the light source may be at a frequency that is different than a desired frequency. For example, the light source may provide light at a fundamental frequency, while the desired frequency may be a harmonic (second, third, and so forth, harmonic for example) of the fundamental frequency. Alternatively, the light provided by the light source is at a frequency that is different from both the fundamental frequency and the desired output frequency.

The light provided by the light source may then be coupled into a resonant cavity by coupling optics (block 810). The coupling optics may be used to efficiently mode match the transverse mode of light emitted by the light source to the transverse mode of the resonant cavity, thereby permitting maximum mode overlap and highest coupling efficiency. The coupling optics may be implemented using optical lenses, focusing elements, as well as optical devices that may be capable of preventing detrimental back reflections of the radiation emitted by the light source, such as Faraday isolators, and so forth.

The light provided by the light source may then be optionally amplified (block 815). The amplification of the light may be performed by a gain medium, such as a laser gain medium (for example, a medium that provides optical gain at the fundamental frequency by a population inversion of real excited states of an atomic, molecular, doped, or stoichiometric crystalline material), or a medium that provides optical gain through nonlinear optical or other means, such as through parametric amplification in a nonlinear material. If the light provided by the light source is at a frequency that is different from both the fundamental frequency and a harmonic of the fundamental frequency, then the light amplification may be used to convert the frequency of the light to the fundamental frequency. Although shown in FIG. 8 as occurring after being coupled into the resonant cavity, the light provided by the light source may be optionally amplified prior to being coupled into the resonant cavity.

The light coupled into the resonant cavity may then be frequency converted by one or more frequency conversion devices, with at least one frequency conversion device being an AFC, into a second frequency (block 820). The second frequency being different from the fundamental frequency. The AFC may generate light at the second frequency in a forward direction more efficiently than light in a backward direction. To help increase frequency conversion efficiency and asymmetry of conversion within the AFC, a phase of the light at the fundamental frequency and a phase of the light at the harmonic of the fundamental frequency may be optionally adjusted (block 825). Adjusting the phases may be performed by a PCU. The light at the harmonic of the fundamental frequency may then be emitted from the resonant cavity (block 830).

Figure 9:
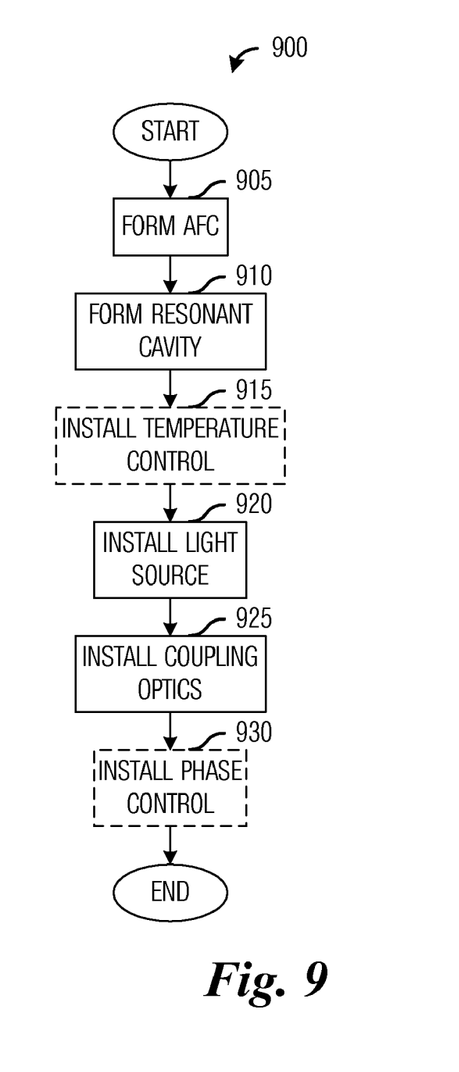
FIG. 9 is a flow diagram for manufacture of a coherent light source.

FIG. 9 is a flow diagram 900 illustrating the manufacture of a coherent light source that makes use of at least one frequency conversion device having an asymmetric frequency conversion property. The order of the events in this sequence may be changed, some optional steps may be omitted or included, or some of the steps may be performed at the same time to meet particular manufacturing requirements of the various embodiments, for example.

The manufacture of a coherent light source may begin with a formation of an AFC (block 905). The AFC may be formed from discrete nonlinear materials, such as materials having seeded SHG, photonic crystals, and so forth, having desired propagation properties, doped materials in waveguide channels, and so forth. More than one AFC may be formed, depending on coherent light source design. A resonant cavity may then be formed (block 910). The resonant cavity may be formed by placing discrete reflective components having desired reflective properties around the AFC, or by polishing and coating the AFC with materials, such as dielectrics or metals, having the desired reflective properties; or by forming reflective structures within the material of the AFC.

In addition to forming the AFC and the resonant cavity, a temperature control unit, such as an oven or some other apparatus for controlling the temperature of the AFC and the resonant cavity may optionally be installed (block 915). Additionally, a light source may be installed (block 920). The light source may provide light at a fundamental frequency that may be frequency converted to a harmonic of the fundamental frequency, producing the output of the coherent light source. If the light source provides a light at a frequency that is different from the fundamental frequency, then it may be possible to perform a frequency conversion to produce light at the fundamental frequency. For example, a gain medium, such as a laser gain medium, may be used to convert the light produced by the light source (not at the fundamental frequency) to light at the fundamental frequency.

Coupling optics may also be installed to match transverse mode radiation emitted by the light source to transverse mode of the AFC and the resonant cavity (block 925). The coupling optics may be implemented using optical lenses, focusing elements, as well as optical devices that may be capable of preventing detrimental back reflections of the radiation emitted by the light source, such as Faraday isolators, and so forth. To further improve frequency conversion efficiency, a phase control unit may optionally be installed (block 930). The phase control unit may be used to adjust the direction of the radiation at the harmonic of the fundamental frequency under electronic control or provide a way for rapid modulation of the radiation.

Figure 10:
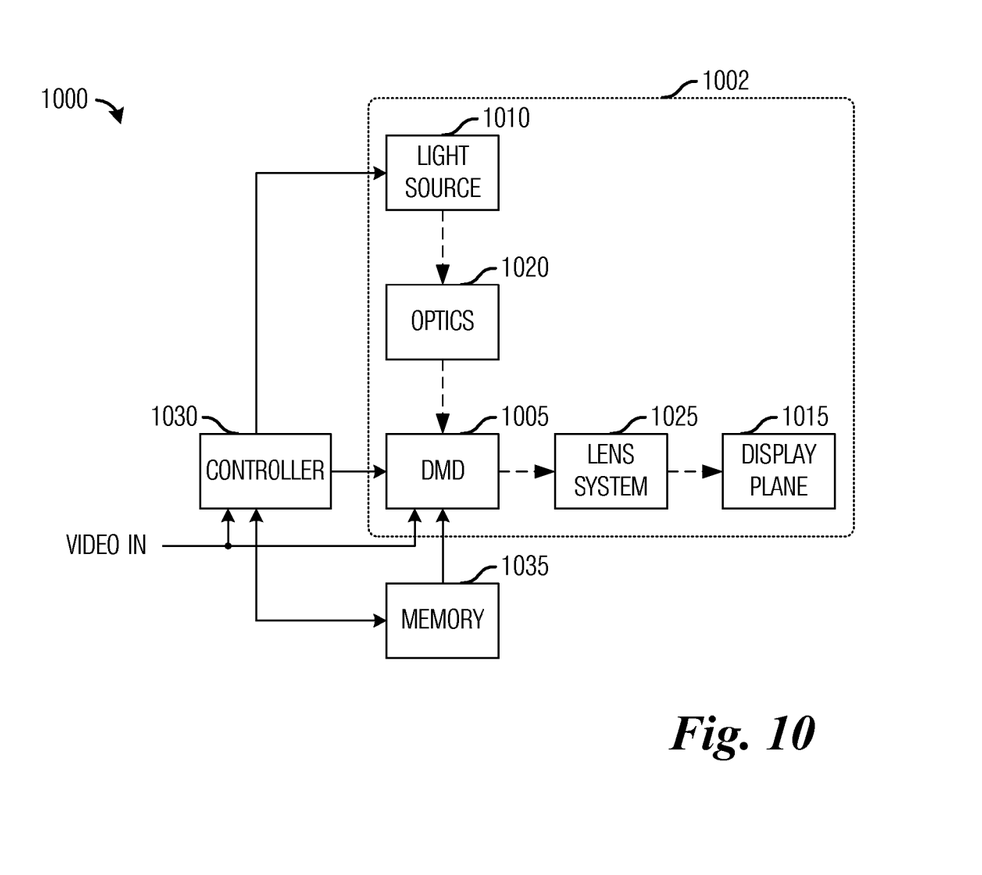
FIG. 10 is a diagram of a display system.

FIG. 10 is a diagram illustrating a display system 1000. Display system 1000 includes an imaging unit 1002 that may be used to display images. Display system 1000 shown in FIG. 10 is a Digital Micromirror Device (DMD)-based projection display system and the imaging unit 1002 includes a DMD 1005 that modulates light produced by a light source 1010. DMD 905 is an example of a microdisplay or an array of light modulators. Other examples of microdisplays may include transmissive or reflective liquid crystal, liquid crystal on silicon, ferroelectric liquid-crystal-on-silicon, deformable micromirrors, and so forth. In a microdisplay, a number of light modulators may be arranged in a rectangular, square, diamond shaped, and so forth, array.

Additionally, instead of a two-dimensional array, the array of light modulators may be a linear array. For example, imaging unit 1002 may make use of a scanned linear array using a linear spatial light modulator. In such a configuration, a linear spatial light modulator may replace DMD 1005. Furthermore, a raster beam scanning device, such as a raster-scanned laser projector, and a temporal light modulator, such as an acousto-optic modulator, may be used in imaging unit 1002, replacing DMD 1005.

Light source 1010 may be a coherent light source capable of producing coherent light in one or more range of frequencies to be used by display system 1000 to display images. In order to produce light at frequencies typically not efficiently produced by coherent light sources, light source 1010 may use frequency conversion to convert light at a first frequency to a harmonic of a fundamental frequency, wherein the first frequency may be equal to (or about equal to) the fundamental frequency. Light source 1010 may use resonant cavities containing one or more AFCs to further help improve frequency conversion efficiency. To produce light at different frequency ranges, light source 1010 may include different light sources, each configured to produce light in a different frequency range.

Each light modulator in the microdisplay may operate in conjunction with the other light modulators in the microdisplay to modulate the light produced by light source 1010. For example, in DMD 1005, each light modulator is a pivoting mirror that generally pivots between one of two positions depending on image data being displayed. In a first position, the light modulator reflects light from the light source onto a display plane 1015 and in a second position, the light modulator reflects light away from display plane 1015. The light modulated by DMD 1005 may be used to create images on display plane 1015. Display system 1000 also includes an optics system 1020, which may be used to collimate the light produced by light source 1010 as well as to collect stray light, and a lens system 1025, which may be used to manipulate (for example, focus) the light reflecting off DMD 1005.

If display system 1000 is a different form of display system, then imaging unit 1002 may be correspondingly different. For example, if display system 1000 uses a different form of microdisplay, then imaging unit 1002 may include the different microdisplay in place of DMD 1005. Alternatively, if display system 1000 is a direct view system instead of a projection system, then imaging unit 1002 may not include display plane 1015 and potentially lens system 1025.

DMD 1005 may be coupled to a controller 1030, which may be responsible for loading image data into DMD 1005, controlling the operation of DMD 1005, providing micromirror control commands to DMD 1005, controlling the light produced by light source 1010, and so forth. A memory 1035, which may be coupled to DMD 1005 and controller 1030, may be used to store the image data, as well as configuration data, color correction data, and so forth.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A coherent light apparatus comprising:
   a coherent light source configured to produce a first coherent light at a first frequency;
   a frequency converter optically coupled to the coherent light source, the frequency converter configured to convert the first coherent light to a second coherent light at a second frequency, the frequency converter comprising
      an asymmetric frequency converter (AFC) configured to nonlinearly convert the first coherent light to the second coherent light, wherein the frequency conversion is more efficient in a first direction than in a second direction, and
      a resonant cavity formed about the AFC, the resonant cavity configured to circulate the first coherent light and to transmit the second coherent light propagating along the first direction out of the resonant cavity; and
   a coupling optic optically coupled between the coherent light source and the frequency converter, the coupling optic configured to match a first mode of the first coherent light to a second mode of the resonant cavity.

2. The coherent light apparatus of claim 1, wherein the AFC has two ends, wherein the resonant cavity comprises a first mirror disposed at a first end of the AFC and a second mirror disposed at a second end of the AFC, wherein the first mirror is configured to admit the first coherent light into the resonant cavity, and wherein the first mirror and the second mirror are configured to circulate the first coherent light in the resonant cavity.

3. The coherent light apparatus of claim 2, wherein the AFC and the first mirror and the second mirror are discrete optical elements.

4. The coherent light apparatus of claim 2, wherein the AFC and the first mirror and the second mirror are a single monolithic block.

5. The coherent light apparatus of claim 4, wherein the first mirror and the second mirror comprise a dielectric material or a metallic material.

6. The coherent light apparatus of claim 2, wherein either one of the first mirror or the second mirror in a light path of the second coherent light propagating in the first direction is configured to transmit the second coherent light, and wherein either one of the first mirror or the second mirror in a light path of the second coherent light propagating in the second direction is configured to reflect the second coherent light back into the resonant cavity.

7. The coherent light apparatus of claim 1, wherein the second frequency is a harmonic of the first frequency.

8. The coherent light apparatus of claim 1, wherein the second frequency is not a harmonic of the first frequency, the coherent light apparatus further comprises a gain medium positioned in a light path of the first coherent light, and wherein the gain medium is configured to produce a third coherent light at a third frequency from the first coherent light.

9. The coherent light apparatus of claim 8, wherein the second frequency is a harmonic of the third frequency.

10. The coherent light apparatus of claim 8, wherein the frequency converter further comprises a fold mirror positioned in the frequency converter and in a light path of the resonant cavity, and wherein the fold mirror is configured to reflect light.

11. The coherent light apparatus of claim 8, wherein the gain medium comprises a material having nonlinear optical properties.

12. The coherent light apparatus of claim 1, wherein the AFC is disposed in a channel of a waveguide, and wherein a light path of the resonant cavity propagates at least partially through the waveguide.

13. The coherent light apparatus of claim 12, wherein the channel has two ends, wherein the resonant cavity comprises mirrors disposed at a first end and a second end of the channel, or distributed Bragg reflectors disposed on a top surface of the channel or within the channel.

14. The coherent light apparatus of claim 1, further comprising a phase control unit optically coupled to the optical frequency converter, the phase control unit is configured to adjust a relative phase between the first coherent light and the second coherent light.

15. The coherent light apparatus of claim 1, wherein the AFC comprises a material having nonlinear optical properties.

16. A method for producing coherent light, the method comprising:
   providing a first coherent light at a first frequency;
   coupling the first coherent light at the first frequency into an optical asymmetric frequency converter;
   converting the coupled first coherent light into a second coherent light at a second frequency, wherein the converting is more efficient in a first direction than in a second direction; and
   emitting the second coherent light at the second frequency.

17. The method of claim 16, wherein the second frequency is not a harmonic of the first frequency, the method further comprising amplifying the first coherent light at the first frequency to produce a third coherent light at a third frequency, wherein the second frequency is a harmonic of the third frequency.

18. The method of claim 16, further comprising adjusting a relative phase between the first coherent light and the second coherent light.

* * * * *